United States Patent Office 3,360,494
Patented Dec. 26, 1967

3,360,494
COATING COMPOSITIONS OF UNSATURATED MONOCARBOXYLIC ACID POLYMER AND POLYURETHANE
Edgar Dare Bolinger, Spartanburg, S.C., assignor to Deering Milliken Research Corporation, Spartanburg, S.C., a corporation of Delaware
No Drawing. Filed Oct. 13, 1966, Ser. No. 586,351
20 Claims. (Cl. 260—29.6)

ABSTRACT OF THE DISCLOSURE

A coating composition comprising a water soluble unsaturated monocarboxylic acid polymer and a water soluble polyurethane carried in an aqueous medium. The polyurethane is present in an amount from about five parts to about one part of the polyurethane per part of the acid polymer. The coating composition is useful as a textile sizing composition and also as an adhesive.

This application is a continuation-in-part of applicant's copending application, Ser. No. 193,314, filed May 8, 1962.

This invention relates to coating compositions and more specially to polyurethane coating and impregnating compositions.

Aqueous polyurethane containing compositions have found use in the textile industry as sizing compositions, the polyurethane compositions being used as a substitute for sizing materials such as sodium carboxymethyl cellulose, gelatin, polyvinyl alcohol and Stymer S (sodium salt of styrene-maleic anhydride copolymer). It should be understood that the term coating compositions as used herein includes not only those compositions which coat the surface of the base material, but also those compositions which penetrate or impregnate the base material.

Heretofore starch had been used almost exclusively as a basic ingredient of textile yarn sizing formulas. Some advances have been made in the use of synthetic size materials other than modified starch, especially in connection with synthetic yarns. Earlier synthetic sizing materials met with only limited success because of their high cost and because they were only operative with a limited number of fibers. Polyethylene glycol terephthalic acid ester yarn, for example, has been a particularly difficult fiber to size with known sizing materials and sizing spun yarn of this nature has remained a major textile problem prior to this invention.

In addition, starch, while functioning satisfactorily in many textile sizing operations, has caused serious water pollution problems. Water pollution problems arise when starch is removed and discarded in textile desizing operations. The starch solutions consume vast amounts of oxygen when they are subjected to bacteria, the loss of oxygen subsequently preventing the survival of plant and animal life in the starch polluted water.

Because polyurethane sizing compositions are nontoxic to aquatic life when discharged in textile desizing operations and have essentially no bioliogical oxygen demand, efforts have been made to improve the basic polyurethane sizing compositions which consists of a water soluble polyurethane in an aqueous medium. The deficiencies which are encountered in use of polyurethane sizing compositions are lack of adhesion to certain fibers, such as for instance, wool, nylon, Dacron and cotton. There is also a tendency for polyurethane sizing compositions to become tacky when employed in the conditions of high humidity which are frequently present in weaving operations. Developing the adhesive characteristics of polyurethane would not only result in an improved sizing composition, but would also result in a polymeric material suitable for other applications such as for instance an adhesive coating composition.

It is therefore an object of this invention to prepare polyurethane coating compositions having improved adhesion.

It is another object of this invention to prepare polyurethane coating compositions having resistance to atmospheric moisture.

It is still another object of this invention to prepare polyurethane containing adhesive coating compositions.

Additional objects of this invention will be more readily apparent from the following detailed description.

I have now discovered that the adhesion of an aqueous polyurethane coating composition can be substantially increased by the addition of a water soluble unsaturated monocarboxylic acid polymer, preferably formed with a vinyl acid such as acrylic acid, butenic acid, pentenic acid, hexenic acid and methacrylic acid. The water soluble unsaturated monocarboxylic acid polymer should be present in quantities such that from about 5 parts of polyurethane to about 1 part of polyurethane are present per part of acid polymer, by weight. In general the range of from about 5 parts of polyurethane to about 3 parts of polyurethane per part of water soluble unsaturated monocarboxylic acid polymer is suitable for use as a textile sizing composition. The range of from about 3 parts to about 1 part of polyurethane per part of water soluble unsaturated monocarboxylic acid polymer is suitable for use as an adhesive coating composition. The quantity of water present in the coating composition will vary according to its intended use. The total solid weight content of the coating composition employed as a textile size for spun yarn should be from about 5% to about 12% by weight and preferably from about 6% to about 8% by weight. The total solid content of the aqueous solution employed as a textile size for filament yarn should be from about 1% to about 4% by weight and preferably from about 1½% to about 3% by weight. The total solids content of the aqueous solution employed as a pressure sensitive adhesive should be from about 5% to about 20% by weight and preferably from about 10% to about 15% by weight.

Advantageously, the monocarboxylic acid polymer which is employed in the composition of invention has a viscosity such that an aqueous solution containing 25% solids has a value between about 100 and 10,000 centipoises at 25° C. and preferably between about 1,000 and 5,000 centipoises. Particularly useful are polyurethanes having a viscosity such that an aqueous solution with 25% solids has a value between 6,000 and 40,000 centipoises at 25° C. and especially those having a viscosity between about 12,000 and 20,000 centipoises.

While the exact nature of the reaction which takes place upon the admixture of a water soluble polyurethane with a water soluble unsaturated monocarboxylic acid polymer is unknown, it is believed that some type of intermolecular linkage, probably of the oxonium bond type, is formed. The gradual addition of a water soluble unsaturated monocarboxylic acid polymer to a water soluble polyurethane results in a slow build up of precipitate and eventually the formation of a gel. The gel may be put into solution by the addition of sufficient amounts of acetone or by the addition of sufficient amounts of an aqueous ammonium hydroxide solution. The dissolution of the gel by the addition of acetone tends to support the theory that the water soluble unsaturated monocarboxylic acid polymer and the water soluble polyurethane are held together by a weak oxonium type bond. The mole ratios of the reactants forming the gel will vary, of course, depending on the exact water soluble unsaturated monocarboxylic acid polymer and the exact water soluble polyurethane selected. When polyacrylic acid having a molecular weight greater than about 50,000 and propylene oxide modified polyurethane prepared from 2,4-toluene diisocyanate and polyethylene glycol of molecular weight of about 6,000 are the selected reactants, it has been found that about 1½ moles of polyurethane will combine with 1 mole of acid polymer to form a gel. The mole ratios are determined by over-titrating a known amount of polyurethane with polyacrylic acid, washing out that portion of the acid not combined in the gel and then titrating the removed portion of acid to determine the exact amount of acid combined. In general, compositions containing water soluble unsaturated monocarboxylic acid polymer in quantities less than required for gel formation are suitable for use as textile sizing compositions. Compositions containing water soluble unsaturated monocarboxylic acid polymer in quantities equal to and in excess of that required for gel formation are suitable for use as adhesive coating compositions.

When the coating composition of this invention is to be used as a textile size, an additional component is preferably added to the composition consisting of polyurethane, the acid polymer and water. The additional component may be defined as a film hardener and may be any component which is compatible with the water soluble polyurethane and which is resistant to the absorption of moisture. Specific film hardeners which have been found to be suitable for purposes of this invention are polyvinyl alcohol and cationic starches.

Any water soluble polyurethane is suitable for purposes of this invention; that is, the water soluble polyurethane may be of the modified or unmodified type. The unmodified type is the reaction product of a diisocyanate and a polyalkylene ether glycol having a molecular weight of from about 2,000 to 20,000. The mole ratio of the reactants is preferably from 1–1/4:1 to 1–1/2:1 of diisocyanate to glycol. The reaction between diisocyanate and glycol is abruptly halted at a point just short of water insolubility preferably by the addition of an aliphatic monohydroxy alcohol which reacts with isocyanate radicals to block further reaction with the glycol. Suitable diisocyanates for this reaction are diisocyanates such as for instance 2,4 toluene diisocyanate, m-phenylene diisocyanate, 4-chloro-1,3-phenylene diisocyanate, methylene-bis-(4 phenyl isocyanate), naphthalene-1,5-diisocyanate and the like.

The preferred unmodified polyurethane employed in this invention is a polyurethane having the following general formula:

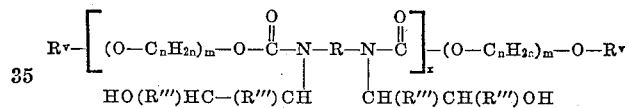

wherein $n$=an integer from about 2 to about 8 inclusive;
$m$=an integer from about 15 to about 450 inclusive;
$x$=an integer of at least 10;
$R$=a divalent nonreactive aliphatic or aromatic radical;

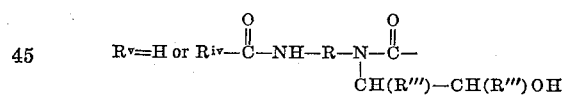

and $R''$ is the radical of the compound used to chain terminate the polymerization reaction, e.g., lower-alkoxy, aryloxy, alkanoyloxy. $x$ is usually a value sufficient to provide a molecular weight of a hundred thousand or more for the resulting polymer. It will be apparent that $x$ increases in value as the polymerization reaction proceeds. No exact value can be ascribed to $x$ as the number varies considerably, depending upon the polymerization reaction conditions and is, at best, an average number. The desired degree of polymerization is best determined by the physical characteristics, e.g., viscosity, film properties, of the resulting product.

The frequency at which $R'$ is H depends in part upon the molar ratio of diisocyanate to polyalkylene ether glycol employed to produce this starting polyurethane. If the lowest possible ratio of 0.5 to 1 were employed, theoretically $R'$ should always be H and $x$ should be 1. However, to produce a starting polymer having the optimum properties, the molar ratio is preferably from about 1.0:1 to 1.5:1. Under these conditions, $R'$ should always be the alternate structure given above. However, because of the viscosity of the reaction mixture, neither of these theoretical conditions are probably reached and $R'$ is probably a mixture of the two alternative possibilities in the resulting polymer molecules.

Unmodified polyurethanes which have been found to be especially suitable are the reaction products of a polyalkylene ether glycol with a diisocyanate wherein the polyalkylene ether glycols have a molecular weight of from about 2,000 to about 10,000 and most desirably from about 4,000 to 8,000. Polyalkylene ether glycols which fall within this range are polyethylene, polypropylene, polytrimethylene, polytetramethylene and polybutylene ether glycols. Suitable diisocyanates are 2,4-toluenediisocyanate, 2,6-toluenediisocyanate, metaphenylenediisocyanate, 2,2'-dinitrodiphenylene, 4,4'-diisocyanate, dihexophenyl 4,4'-diisocyanate, hexamethylene diisocyanate, diphenylene 4,4'-diisocyanate, diphenylmethane 4,4'-diisocyanate, diparaxylmethane 4,4'-diisocyanate, naphthalene-1,4-diisocyanate and the corresponding 1,5 and 2,7 isomers thereof, fluorene, 2,7-diisocyanate, chlorophenylene, 2,4-diisocyanate and dicyclohexylmethane 4,4'-diisocyanate.

The modified water soluble polyurethanes which are suitable for purposes of this invention are represented by the general formula

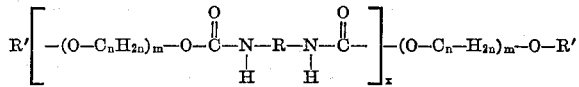

wherein $n$=an integer from about 2 to about 8, inclusive;
$m$=an integer from about 15 to about 450, inclusive;
$R$=a divalent nonreactive aliphatic or aromatic radical;
$R'''$=H or a nonreacting aliphatic or aromatic radical;
$R^{iv}$=an organic radical which renders the hydrogen active;

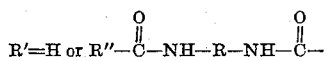

and $x$ is an integer which increases as the reaction time increases. $R^v$ is H in some of the molecules when less than a molar equivalent of diisocyanate is employed per mole of polyalkylene ether glycol; the lower the proportion of diisocyanate to glycol, the more frequently $R^v$ will be H. When the molar proportion of diisocyanate to glycol is 0.5 to 1 then $R^v$ will, for the most part, be H and $x$ will most frequently be 1.

The preferred modified polyurethanes employed herein are prepared by a three-step reaction as disclosed in U.S. Patent No. 3,267,079. The reaction is carried out by first forming a polyalkylene ether glycol diisocyanate polymer. This polymer is then reacted with an epoxide to block the amide group and as a third and final step chain terminating operations are carried out. The polyalkylene ether glycols employed in the reaction are prepared polyalkylene ether glycols having a molecular weight of from about 2,000 to about 10,000 and most desirably from about 4,000 to about 8,000. Suitable diisocyanates are diisocyanates such as 2,4-toluene diisocyanate, 2,6-toluene diisocyanate, metaphenylene diisocyanate, 2-nitro-diphenylene 4,4'-diisocyanate, cyclohexylphenyl 4,4'-diisocyanate, hexamethylene diisocyanate, diphenylene 4,4'-diisocyanate, diphenylmethane 4,4'-diisocyanate, diparadimethane 4,4'-diisocyanate, naphthalene 1,4-diisocyanate, and the corresponding 1,5 and 2,7-isomers thereof, fluorene 2,7-diisocyanate, fluorophenylene 2,4-diisocyanate and dicyclohexylmethane 4,4'-diisocyanate. Suitable epoxides which may be reacted with polyalkylene ether glycol diisocyanate polymer are epoxides containing from 2 to 12 carbon atoms, such as, for instance, styrene oxide, alpha phenyl propylene oxide, trimethylene oxide, ethylene oxide, propylene oxide, butylene oxide and isobutylene oxide. Suitable chain terminating agents for carrying out the third step of the three-stage reaction are agents such as alcohol, ammonia, cyclic secondary amines, inorganic salts having an active hydrogen, mercaptans, amides, alkanol amides, amines and oxides. The preferred class of chain terminating agents are the organic monohydroxy compounds, preferably monohydroxy alcohol and especially the saturated aliphatic alcohol primary and secondary monoamino compounds, aryl monohydroxy compounds and the like.

Sizing textiles with a coating composition of this invention may be performed according to usual procedures. However, superior yarn penetration is obtained at temperatures between 120° F. and 180° F. It has also been found that adjusting the pH of the coating composition to the range of from about 7.5 to about 9.0 by the addition of ammonia sometimes provides improvement.

The invention involved in the novel size coating composition will be better understood in the following typical examples.

Example I

A warp of several thousand ends of 1/38 Dacron-cotton combed yarn is sized on conventional synthetic slasher equipment having a heated size-box, standard squeeze rolls and Teflon-coated dry cans. The yarns are impregnated by passing them through the size box containing a water solution of one part solid weight of polyacrylic acid and 4 parts solid weight of propylene oxide modified water soluble polyurethane, the polyurethane being the reaction product of 2,4-toluene diisocyanate and polyethylene glycol of molecular weight 6,000 chain terminated with ethyl alcohol. The polyacrylic acid employed has a viscosity of about 2500 centipoises in a 25% by weight solids solution at 25° C. and the polyurethane a viscosity of about 18,000 centipoises under the same conditions. The size-box temperature was kept at 140° F., drying was completely conventional with dry can temperatures of about 200° F. The slasher operated smoothly without harsh size problems. Weaving also progressed well for a 24-hour period. At a warp size pickup of about 8% the woven greige cloth has a soft hand similar to finished fabric in sharp contrast to the usual harsh hand with starch size. The fabric also has less nap and is free of powdered size and, therefore, has a neater, cleaner appearance.

Example II

A warp of several thousand ends of a blended 65% Dacron 35% viscose 1/24 yarn is sized on conventional synthetic slasher equipment having a heated size-box standard squeeze roll and Teflon-coated dry cans. The yarns are impregnated by passing them through the size-box containing an aqueous solution of four parts solid weight of modified water soluble polyurethane, one part solid weight of polyacrylic acid hardened with polyvinyl alcohol, the polyvinyl alcohol being present in quantities sufficient to make up 5% of the total solid weight. The polyacrylic acid and polyurethane are the same materials as employed in Example I.

The yarns are impregnated by passing them through the size-box at a temperature of 140° F. Drying is completely conventional with dry can temperatures of about 200° F. Slashing and weaving operations run well without any build up on the shuttle. When the woven fabric is compared with a similar test panel of starch-size material, it is found that the modified polyurethane size material has a much sharper weave pattern and is several shades darker due to the absence of powdered size.

Example III

A warp of several thousand ends of all wool-worsted 26/1 yarn is sized on a conventional synthetic slasher having a heated size-box, standard squeeze roll and Teflon-coated dry cans. The yarn is impregnated by passage through the size-box containing a water solution of three parts of unmodified water soluble polyurethane and one part solid weight of polyacrylic acid. The polyurethane has a viscosity of about 10,000 centipoises as measured with a 25% by solids solution at 25° C., and the polyacrylic acid has a viscosity of about 4000 centipoises under the same conditions. The size-box temperature is kept at 140° F., drying being completely conventional with dry can temperatures of about 200° F. The slasher operation is smooth. A fabric is produced which is free of powdered size and which is neat and clean in appearance.

Example IV

A warp of several thousand ends of spun nylon yarn is sized on a conventional synthetic slasher having a heated size-box, standard squeeze roll and teflon-coated dry cans. The yarn is impregnated by passage through the size-box containing a water solution of four parts of water soluble modified polyurethane and one part solid weight of polymethacrylic acid. The size-box temperature is kept at about 140° F., drying being completely conventional with dry can temperatures of about 200° F. The slasher operation is smooth. The finished fabric is free of powdered size and has a neat and clean appearance.

The polyurethane has a viscosity of about 20,000 centipoises in a 25% solids solution at 25° C., and the polymethacrylic acid has a viscosity of about 800 centipoises under the same conditions.

Example V

A warp of several thousand ends of cotton yarn 1/40 is sized on conventional synthetic slasher equipment having heated size-box, standard squeeze rolls and Teflon-coated dry cans. The yarn is impregnated by passage through a size-box containing a water solution of four parts by weight of water soluble modified polyurethane, one part solid weight of polymethacrylic acid and cationic starch present in amounts such as to compose 5% of the total solid weight. The polyurethane is of a viscosity about 13,000 centipoises in a 25% solids solution at 25° C. and the polymethacrylic acid 6,000 centipoises with the same solids and at the same temperature. The size-box temperature is kept at 140° F. drying being completely conventional with dry can temperatures of about 200° F. The slasher and the weaving operation is smooth without any gummy build up on the shuttle in weaving operation. A finished fabric is produced which has a sharp weave pattern and a neat clean appearance due to the absence of powdered size.

Example VI

A warp of several thousand ends of filament Dacron (polyethylene-terephthalate) yarn is sized on conventional synthetic slasher equipment having heated size-box, standard squeeze rolls and Teflon-coated dry cans. The yarn is impregnated by passage through a size-box containing on a 100 part basis a water solution of two parts solid weight of water soluble modified polyurethane and one-half part solid weight of polyacrylic acid. The polyurethane is of a viscosity about 25,000 centipoises in a 25% solids solution at 25° C. and the polyacrylic acid 2,000 centipoises with the same solids and at the same temperature. The size-box temperature is kept at 140° F., drying being completely conventional with dry can temperatures of about 200° F. The slasher operation is smooth. The finished fabric is free of powdered size and has a neat and clean appearance.

As previously stated, when the unsaturated water soluble monocarboxylic acid polymer content of the coating composition of this invention is increased to the range of from three parts of polyurethane to one part of polyurethane per part of polyacrylic acid, adhesive coating compositions result. Surfaces coated with the adhesive coating compositions of this invention have a remarkable degree of pressure sensitivity toward like-coated surfaces, that is to say the coated surfaces are cohesive. The adhesive properties of the coating composition containing increased amounts of water soluble unsaturated monocarboxylic acid polymer are measured by laminating a thin film of the coating composition between two strips of fabric. In general, the testing procedure may be carried out by casting films of the coating composition. These films are then laminated between one inch fabric strips in a mold heated to about 80° C. for one-half hour and cooled to room temperature before opening the mold. Adhesion is measured on the Instron Tester which makes measurements in pounds pull to separate the two fabric layers.

The evaluation of the novel pressure sensitive coating composition will be better understood from the following examples.

*Example VII*

A film .001 to .003 inch thick is cast. The film consisting of one part by weight of polyacrylic acid and three parts by weight of propylene oxide modified water soluble polyurethane, the polyurethane being the reaction product of 2,4-toluene diisocyanate and polyethylene glycol of molecular weight 6,000. The polyurethane is of a viscosity about 18,000 centipoises in a 25% solids solution at 25° C. and the polyacrylic acid 2,500 centipoises with the same solids and at the same temperature. The film is then laminated between one inch fabric strips of wool worsted. The three-layer laminate is then placed in a mold at a temperature of about 80° C. and retained there for a period of one-half hour. The mold is allowed to cool before opening and removing the laminate. Adhesion is then measured on an Instron Tester in pounds pull to separate the two fabric layers. Approximately 10 pounds pull is required to delaminate the two fabric layers.

*Example VIII*

A film of from .001 inch to .003 inch thickness is cast. The composition of the film is four parts by weight of propylene oxide modified water soluble polyurethane polymer and one part by weight of polyacrylic acid. The polyurethane is of a viscosity about 15,000 centipoises in a 25% solids solution at 25° C. and the polyacrylic acid 3,500 centipoises with the same solids and at the same temperature. The cast film is laminated between one inch fabric strips of 55% Dacron and 45% wool. The three component laminate is placed in the mold for a period of one-half hour at a temperature of about 80° C. The mold is then cooled to room temperature before opening and removing the laminate. Adhesion of the laminate is measured on an Instron Tester in pounds pull to separate the two fabric layers. More than 10 pounds of pull is required to delaminate the two fabric layers.

*Example IX*

A film is cast having a thickness of from .001 to .003 inch. The composition of the film is one part by weight of a propylene oxide modified polyurethane resin and one part by weight of polyacrylic acid. The polyurethane is of a viscosity about 12,000 centipoises in a 25% solids solution at 25° C. and the polyacrylic acid 4,500 centipoises with the same solids and at the same temperature. The film is laminated between one inch fabric strips of wool. The three component laminate is placed in a mold and heated to about 80° C., the laminate being retained in the mold for a period of about one-half hour. The mold is then allowed to cool to room temperature before removal of the laminate. Adhesion is measured on the Instron Tester in pounds pull to separate the two fabric layers. About nine pounds of pull is required to delaminate.

*Example X*

A film .001 to .003 inch thick is cast. The composition of the film is one part by weight of unmodified water soluble polyurethane and one part by weight of polymethacrylic acid. The polyurethane is of a viscosity about 13,000 centipoises in a 25% solids solution at 25° C. and the polymethacrylic acid 4,000 centipoises with the same solids and at the same temperature. The film is laminated between one inch woolen fabric strips. The three component laminate is placed in a mold heated to a temperature of about 80° C. for a period of about one-half hour. The mold is allowed to cool to room temperature before removal of the laminate. Adhesion is measured on an Instron Tester in pounds pull to separate the two fabric layers. About nine pounds of pull is required to delaminate the two fabric layers.

*Example XI*

An adhesive coating composition is prepared by first formulating an aqueous solution of 25% by weight of a propylene oxide modified polyurethane, the polyurethane being the reaction product of 2,4-toluene diisocyanate and polyethylene glycol of molecular weight 6,000. An aqueous solution of 25% by weight polyacrylic acid is then prepared. The polyurethane is of a viscosity about 15,000 centipoises in a 25% solids solution at 25° C. and the polyacrylic acid 3,000 centipoises with the same solids and at the same temperature. Five parts by weight of the polyurethane solution and three parts by weight of the polyacrylic acid solution are then admixed and the resultant adhesive composition is painted on one face of each of two waterproof paper strips. The coated surfaces of the paper strips are then pressed together and allowed to dry for a twenty hour period. More than 100 grams of pull is required to delaminate the strips. The coated surfaces of the individual strips are still tacky and exert strong cohesive forces toward each other when pressed together.

Preparation of the sizing composition of this invention is relatively simple. The sizing composition is prepared by a simple admixture of polyurethane and the water soluble unsaturated monocarboxylic acid polymer in sufficient quantities of water or other solvents. The preparation of the adhesive coating composition of this invention, however, may be carried out by any one of two alternative forms. The two alternative forms embody the preparation of a gel from the appropriate amounts of water soluble polyurethane and water soluble unsaturated monocarboxylic acid polymer and then dissolving the gel in an aqueous solution of ammonium hydroxide or dissolving the gel in an acetone-water solution. When the gel is in solution, coating operations may be carried out by any of the well-known means, that is, by methods such as for instance, dipping, spraying or painting. The preferred method of depositing the adhesive of this invention is to dissolve the gel in an acetone-water solution. The acetone-water solution will evaporate off at room temperature leaving a gel coating deposited on the base material. When the gel is placed in solution through the use of an ammonium hydroxide aqueous medium the application of heat is necessary to drive off the ammonia and restore the gel.

Having thus disclosed my invention, what I claim is:

1. A coating composition comprising a water soluble unsaturated monocarboxylic acid polymer and a water soluble polyurethane carried in an aqueous medium, said polyurethane being the reaction product of a diisocyanate and a polyalkylene ether glycol and being present in amounts of from about five parts to about one part of polyurethane per part of said acid polymer.

2. The coating composition of claim 1 wherein said water soluble unsaturated monocarboxylic acid polymer is formed with an acid selected from the group consisting of acrylic acid, butenic acid, pentenic acid, hexenic acid, and methacrylic acid.

3. A textile sizing composition comprising a water soluble unsaturated monocarboxylic acid polymer and a water soluble polyurethane carried in an aqueous medium, said polyurethane being the reaction product of a diisocyanate and a polyalkylene ether glycol and being present in an amount from about three parts to about five parts of polyurethane per part of said acid polymer.

4. The textile sizing composition of claim 3 wherein said water soluble unsaturated monocarboxylic acid polymer is formed with an acid selected from the group consisting of acrylic acid, butenic acid, pentenic acid, hexenic acid and methacrylic acid.

5. An adhesive coating composition comprising as solid constituents a water soluble unsaturated monocarboxylic acid polymer and a water soluble polyurethane, said polyurethane being the reaction product of a diisocyanate and a polyalkylene ether glycol and being present in amounts of from about three parts to about one part of polyurethane per part of said acid polymer.

6. The adhesive coating composition of claim 5 wherein said water soluble unsaturated monocarboxylic acid polymer is formed with an acid selected from the group consisting of acrylic, butenic, pentenic, hexenic and methacrylic acid.

7. A textile sizing composition comprising a water soluble unsaturated monocarboxylic acid polymer, a water soluble polyurethane carried in an aqueous medium and a film-hardening agent selected from the group consisting of cationic starch and polyvinyl alcohol, said polyurethane being the reaction product of a diisocyanate and a polyalkylene ether glycol and being present in amounts of from about three parts to about five parts of polyurethane per part of said acid polymer.

8. The textile size of claim 7 wherein said water soluble unsaturated monocarboxylic acid polymer is formed with an acid selected from the group consisting of acrylic acid, butenic acid, pentenic acid, hexenic acid and methacrylic acid.

9. A textile sizing composition comprising a water soluble unsaturated monocarboxylic acid polymer formed with an acid selected from the group consisting of acrylic acid, butenic acid, pentenic acid, hexenic acid and methacrylic acid, a water soluble polyurethane carried in an aqueous medium and a polyvinyl alcohol film hardening agent carried in an aqueous medium, said polyurethane being the reaction product of a diisocyanate and a polyalkylene ether glycol and being present in an amount from about three parts to about five parts of polyurethane per part of monocarboxylic acid polymer.

10. A textile sizing composition comprising a water soluble unsaturated monocarboxylic acid polymer formed with an acid selected from the group consisting of acrylic acid, butenic acid, pentenic acid, hexenic acid, and methacrylic acid and a propylene oxide modified water soluble polyurethane, said polyurethane being the reaction product of 2,4-toluene diisocyanate and polyethylene glycol of molecular weight 6,000, said polyurethane being present in an amount from about three parts to about five parts of polyurethane per part of said acid polymer.

11. The textile sizing composition of claim 10 wherein said unsaturated monocarboxylic acid polymer is polyacrylic acid.

12. A textile sizing composition comprising a water soluble unsaturated monocarboxylic acid polymer formed with an acid selected from the group consisting of acrylic acid, butenic acid, pentenic acid, hexenic acid and methacrylic acid and a propylene oxide modified water soluble polyurethane, said polyurethane being the reaction product of 2,4-toluene diisocyanate and polyethylene glycol of molecular weight of 6,000 and a film-hardening agent selected from the group consisting of cationic starch and polyvinyl alcohol, said polyurethane being present in an amount from about three parts to about five parts of polyurethane per part of said acid polymer.

13. The textile sizing composition of claim 12 wherein said unsaturated monocarboxylic acid polymer is polyacrylic acid.

14. An adhesive coating composition comprising a water soluble unsaturated monocarboxylic acid polymer formed with an acid selected from the group consisting of acrylic acid, butenic acid, pentenic acid, hexenic acid and methacrylic acid and a propylene oxide modified water soluble polyurethane, said polyurethane being the reaction product of 2,4-toluene diisocyanate and polyethylene glycol of molecular weight 6,000, said polyurethane being present in an amount from about three parts to about one part of polyurethane per part of acid polymer.

15. The adhesive coating composition of claim 14 wherein said unsaturated monocarboxylic acid polymer is polyacrylic acid.

16. A process for preparing an adhesive coating comprising adding a water soluble monocarboxylic unsaturated acid polymer to a water soluble polyurethane in an aqueous medium, said polyurethane being the reaction product of a diisocyanate and a polyalkylene ether glycol and being present in an amount from about three parts to about one part of polyurethane per part of said acid polymer, dissolving the resultant gel in a solvent selected from the group consisting of an acetone-water mixture and an aqueous solution of ammonium hydroxide, coating a substrate with said solution and then heating to drive off the solvent and restore the gel.

17. A process for preparing an adhesive coating comprising adding a water soluble unsaturated monocarboxylic acid polymer to a polyurethane in an aqueous medium, said polyurethane being the reaction product of a diisocyanate and a polyalkylene ether glycol and being present in an amount from about three parts to about one part of polyurethane per part of said acid polymer, dissolving the resultant gel in an acetone-water-solvent, coating a substrate with the resultant solution and then heating to drive off the solvent and restore the gel.

18. The process of claim 17 wherein said water soluble unsaturated monocarboxylic acid polymer is formed with an acid selected from the group consisting of acrylic acid, butenic acid, pentenic acid, hexenic acid and methacrylic acid.

19. The coating composition of claim 1 wherein said water soluble unsaturated monocarboxylic acid polymer has a viscosity between about 100 and 10,000 centipoises and said polyurethane has a viscosity between about 6,000 and 40,000 centipoises at 25° C. in aqueous solutions containing 25% solids by weight.

20. The textile sizing composition of claim 7 wherein said water soluble unsaturated monocarboxylic acid polymer has a viscosity between about 1000 and 5000 centipoises and said polyurethane has a viscosity between about 12,000 and 20,000 centipoises at 25° C. in aqueous solutions containing 25% solids by weight.

References Cited
UNITED STATES PATENTS

| | | | |
|---|---|---|---|
| 2,948,691 | 8/1960 | Windemuth et al. | 117—139.5 |
| 3,044,898 | 7/1962 | Habib | 252—8.6 |
| 3,152,920 | 10/1964 | Caldwell et al. | 117—139.5 |

WILLIAM H. SHORT, *Primary Examiner.*

J. NORRIS, *Assistant Examiner.*